US012246349B2

(12) United States Patent
Cohen et al.

(10) Patent No.: US 12,246,349 B2
(45) Date of Patent: Mar. 11, 2025

(54) SONIC MIXER

(71) Applicants: Arnold H Cohen, Andover, MA (US); James Q Maloy, Marina Del Ray, CA (US)

(72) Inventors: Arnold H Cohen, Andover, MA (US); James Q Maloy, Marina Del Ray, CA (US)

( * ) Notice: Subject to any disclaimer, the term of this patent is extended or adjusted under 35 U.S.C. 154(b) by 774 days.

(21) Appl. No.: 16/705,944

(22) Filed: Dec. 6, 2019

(65) Prior Publication Data

US 2021/0170350 A1 Jun. 10, 2021

(51) Int. Cl.

*B01F 11/02* (2006.01)
*B01F 15/00* (2006.01)
*B06B 1/04* (2006.01)

(52) U.S. Cl.

CPC .................................... *B06B 1/04* (2013.01)

(58) Field of Classification Search

CPC .. B01F 31/86; B06B 1/04; H04R 1/02; H04R 5/023; H04R 7/02

See application file for complete search history.

(56) References Cited

U.S. PATENT DOCUMENTS

| | | | | |
|---|---|---|---|---|
| 7,188,993 | B1 | 3/2007 | Howe et al. | |
| 7,264,192 | B1 | 9/2007 | Yanagi | |
| 7,866,878 | B2 | 1/2011 | Howe | |
| 9,094,747 | B2 * | 7/2015 | Rayner | H04R 1/02 |
| 10,070,237 | B2 * | 9/2018 | Hanna | H04R 3/007 |
| 10,659,856 | B1 * | 5/2020 | Pierce | H04R 1/026 |
| 10,667,040 | B1 * | 5/2020 | French | H03F 3/181 |

FOREIGN PATENT DOCUMENTS

| | | | |
|---|---|---|---|
| JP | 08266879 | A | 10/1996 |
| RU | 72871 | U1 | 5/2008 |
| WO | WO 2008/088321 | | 7/2008 |

* cited by examiner

*Primary Examiner* — Elizabeth Insler
(74) *Attorney, Agent, or Firm* — Thomas E Hagar

(57) ABSTRACT

An apparatus designed to mix powders or fluids, or both, with the least amount of effort and energy. The mixing is accomplished with an assembly similar to an audio speaker connected to a container. The apparatus is charged with an electrical source which causes it to agitate the container so that its contents are mixed. Through a variety of different methods, the apparatus is caused to go into mechanical resonance thereby maximizing its agitation and thus its mixing efforts. An internal computer is used to monitor, maintain, and help place the apparatus in mechanical resonance. There is an option to add a cover to the apparatus which acts as both a sound reduction mechanism and a safety mechanism ensuring that anything that might become loose from the container will not come in contact with the operator.

10 Claims, 9 Drawing Sheets

SONIC MIXER

BACKGROUND OF THE INVENTION

The mixing and compounding of materials have been going for centuries and there has always been a desire to mix materials faster and more efficiently. A mortar and pestle is one of the early technologies in the mixing and compounding of materials. Soon materials were mixed by shaking the materials in containers. Thereafter, various types of rotating motorized mixers were employed to mix and compound material.

Then mixers which could mix by axially shaking a container were developed to further increase the efficiency of mixers. Currently, these axial shakers are available by devices which use motor driven cams and platforms to achieve the vertical vibrations for the mixing action. When powders are mixed in these types of mixers, the powders are mixed thoroughly and quickly.

Mixing of powders is an important process in many industries and not the least important are pharmacies, laboratories and hospitals. Researchers in laboratories have noted that powders behave like fluids when undergoing vertical vibration in a closed container. The mixing action is smooth and rapid.

One downside to the axially mixers is the need to use motors and frames large enough to deliver the high enough gravitational forces necessary to achieve the desired results. These factors necessarily make these types of mixers complex, heavy and expensive.

The present invention overcomes these setbacks of a complex, heavy and expensive mixer but not at the expense of the efficiency of the mixing process. The invention uses a novel concept of placing a device in mechanical resonance when agitation is at a maximum. The invention uses the benefits of variable frequency characteristics of an audio speaker type design to find the resonant frequency of the system which includes the mixer itself and the container holding the items to be mixed.

Operating at the resonant point of the system the invention achieves maximum force on the material being mixed using the minimum power input. Thus, the invention can me made of a lower weight and less expensive materials than that of the common axially mixer present in the industry. The invention is much lighter, smaller and less costly because it uses mechanical resonance to achieve the forces necessary to mix the materials.

None of the prior art individually, or in combination, demonstrate the above concepts presented by the invention. The invention solves the need for a cost effective mixer that can mix at a high efficiency and speed by placing the mixer in resonance, a concept not taught in the prior art. Indeed, some of the prior art teaches away and discourages the use of placing or having a mixer in go into mechanical resonance. (See U.S. Pat. No. 7,188,993).

BRIEF SUMMARY OF THE INVENTION

The purpose of the invention is to provide a device for mixing a plurality of powders or fluids, or a combination of the two, using the least amount of energy and time. Applications of this invention are for mixing of powders for use in a number of fields; including, the pharmaceutical industry, at a pharmacy or at a laboratory. The invention provides an apparatus to mix items in the quickest possible time by placing the apparatus in mechanical resonance. The apparatus optionally may have a cover and when the cover is closed the noise from the apparatus's operation is reduced and the operator is shielded from the container and its contents.

In the preferred embodiment, the present invention is comprised of a mixing assembly that is similar to an audio speaker in design and is housed in an enclosure. A container holding the items that are to be mixed is attached to the mixing assembly. A touch screen is provided for ease of use and an internal computer is employed to operate the apparatus. Alternatively, an external handheld type computer could be employed to operate the apparatus and operate in conjunction with or in place of the internal computer.

One object of this invention is to facilitate the mixing of two or more powders or fluids or a combination of two or more powders or fluids.

In the preferred embodiment the apparatus consists of a magnet assembly, a force coil assembly, a spider, a cone assembly, an adapter ring, a frame, an enclosure, a container, a touch screen, a cover, a Hall element with an internal magnet, a Hall element in conjunction with an external magnet, an electrical source to energize the apparatus and an internal computer to monitor, find and maintain the system in resonance. The electrical source generates a variable frequency constant amplitude alternating voltage or variable frequency constant amplitude alternating current. The computer maintains the system in resonance and will, among many things, record, monitor and adjust the voltage or current, and frequency of the electrical source charging the apparatus.

The electrical source will generate a variable frequency constant amplitude alternating voltage or variable frequency constant amplitude alternating current that will charge the force coil assembly. The force coil assembly consists of a force coil which is a wire winding around a tube made of plastic, or paper or similar material, and is axially aligned with the pole and magnet of the magnet assembly. In addition, the force coil assembly is attached to the spider and the cone assembly which in turn are attached to the frame assembly. As the wire of the force coil is charged by the alternating electrical source it will cause the force coil assembly to oscillate up and down due to its relationship with the magnetic field of the magnet as such movement is known in the industry of audio speakers. As the cone assembly is attached to the force coil assembly, it will move with and in the same manner as the force coil assembly.

The adapter ring is attached to the cone assembly and is designed to accept the tapered conical container which has a threaded portion so it can be affixed to the adapter ring. Once the container is affixed to the adapter ring, which is attached to the cone, the container will move and oscillate as the force coil assembly moves and oscillates. Consequently, as the force coil assembly moves the container will move and the contents of the container will be mixed.

The oscillating movement of the force coil assembly will create the necessary agitation to mix the items in the container, with no stirring required. As the oscillation of the force coil assembly increases the agitation increases in the container. The increase in agitation of the container will more effectively mix the contents of the container as known in the industry. The agitation reaches its maximum with the minimum amount of energy once the system is placed and maintained at the resonant point. As the weights of the materials to be mixed will differs from job to job, so will the resonant point of the system will differ from job to job as the latter is related to the former.

There are many ways in which the apparatus can be placed and maintained in resonance. In the preferred embodiment of the apparatus the resonant point of the system is found with the aid of a Hall element, which generates a voltage directly proportional to the current flowing through the element. A Hall element is incorporated into the electrical circuitry of the apparatus and is placed in electronic series with the force coil assembly.

The voltage generated by the Hall element is measured, recorded and monitored by the internal computer. The voltage output of the Hall element is proportional to the current running through the element. The Hall element has a hall coefficient and an internal magnet that creates a constant magnetic field intensity which is independent of the electrical current that runs through the Hall element.

The current running through the Hall element can be calculated by the following equation: I=Vi(Rh*B). Where I is the current, Vi is the voltage output of the Hall element, Rh is the hall coefficient and B is the magnetic field intensity created by the internal magnet. As Rh and B are known for a given Hall element the internal computer can then make the above calculation to calculate the current for a given voltage output by the Hall element. The internal computer can make these calculations continuously as the system runs and as the voltage output from the Hall element changes from time to time due to the corresponding changes in the current running through the element. Therefore, the internal computer in conjunction with the Hall element will be able to provide a continuous stream of the value of the current running through the Hall element.

There a few methods that can be employed using the Hall element to find the resonant point of the apparatus for a given mixing job.

In the preferred method a variable frequency constant amplitude alternating voltage is employed to energize the force coil. The apparatus is in mechanical resonance when the frequency of the alternating voltage starts to vary from the high to low and at the point when the current, as calculated by measuring the voltage generated by the Hall element, reaches its absolute minimum. At resonance the current reaches its minimum point as the impedance of the force coil reaches its highest value.

A second method to find the resonant point is by monitoring the phase angle between a current sine wave and an applied voltage sine wave. The applied voltage sine wave is created from the voltage measured at the electrical source. The current sine wave is created from current as calculated from the voltage output of the Hall element as seen above. The two sine waves are compared and a phase angle, measured in degrees, between the two sine curves is observed, the phase angle could be positive or negative. The frequency of the constant amplitude alternating voltage electrical source is adjusted until the phase angle between the two sine curves is at zero degrees. The apparatus is in resonance at the point where the phase angle is at zero degrees.

The resonant frequency will differ from mixing job to mixing job as the resonant point is necessarily related to the total mass of the contents in the container, the container itself, the adapter ring, and the spring constant of the spider combined with the cone assembly. Not all mixing jobs are the same, and thus the overall weight of the contents in the container will change as differing mixing jobs will use differing amounts of powders, or fluids, and/or use powders, or fluids, with differing weights. As the overall weight of the items to be mixed will differ from mixing job to mixing job the resonant frequency will necessarily be different for each mixing job as the two are related. Accordingly, a computer is needed to monitor the system, to help find the differing resonant frequencies of the differing mixing jobs, and to maintain the system in resonance.

At times when the apparatus mixes items at resonance it can become noisy. Accordingly, an optional cover may be added to the apparatus to provide sound reduction. This cover is affixed to the housing via a hinge and when the cover is placed in its closed position the cover surrounds and encapsulates the container. With the cover in place it helps reduce the sound of the apparatus while at the same time acting as a shield between the container and the operator.

In another embodiment of the apparatus the resonant point of the system is found with the aid of a low value resistor. A resistor is incorporated into the electrical circuitry of the apparatus and is placed in series with the force coil, in a similar fashion as with the Hall element described above. The voltage across the resistor is measured and monitored by the computer. Ohm's Law states that the current through a resistor between two points is directly proportional to the voltage across these two points. This is commonly expressed in the mathematical equation of I=V/R, or current equals voltage divided by the resistor value. The voltage is measured in volts, current is measured in amperes, and resistor value is measured in ohms.

The value of the resistor is known and therefore if one measures the voltage across the resistor one will know the value, using Ohm's Law, of the current at the time the voltage was measured. There a few methods that can be employed using the resistor to find the resonant point of the apparatus for a given mixing job. These methods are exact same methods used with the Hall element described above.

In another embodiment, the electrical source provides a variable frequency constant amplitude alternating voltage or a constant amplitude voltage to the force coil. The computer will automatically increase the frequency of the electrical source from zero to a point where the resonant point to achieved. The resonance point is achieved when the current flowing to the force coil is at its minimum. Once achieved the resonant frequency is maintained by the internal computer. If desired, the computer is capable of passing the resonant frequency and will then return the system to its resonant frequency.

Another embodiment of the invention uses a variable frequency constant amplitude alternating current source to help determine resonance. The constant amplitude alternating current is employed to energize the force coil. The apparatus is in resonance when the frequency of the constant amplitude alternating current starts to vary from high to low and at the point where the voltage across the force coil, as measured by the internal computer, reaches its absolute maximum. The voltage reaches its maximum point as the apparatus' impedance reaches its highest value which is at resonance, as shown in FIG. 7. Similar to Ohm's Law regarding resistors, the voltage is directly proportional to the impedance and is expressed in the mathematical equation as V=IZ, or voltage equals current times impedance.

In yet another embodiment of the invention a second coil, a recording coil, is incorporated into the apparatus and is insulated from the force coil. This recording coil wraps around the same plastic or paper tube and is axially aligned with the pole, magnet of the magnet assembly, and force coil. The force coil is energized and oscillates as described above in the constant current embodiment.

The recording coil is employed to measure a voltage created by moving this coil through the magnetic field of the apparatus' magnet. The internal computer will record the voltage measured by this recording coil. These voltage measurements will provide a continuous measurement of both the amplitude and the frequency of the force coil assembly's oscillation during the operation of the apparatus. As the frequency is increased the apparatus will go into resonance when the voltage generated in the recording coil is at its peak.

In yet another embodiment of the invention an accelerometer is used to aid in the finding of the resonant point of the apparatus for a given mixing job. In this embodiment an accelerometer is attached to the spider of the apparatus. The accelerometer measures the acceleration of the system and the resonant frequency is achieved when the acceleration of the system is at its maximum acceleration.

In another embodiment of the invention the internal computer is replaced by or works in conjunction with an external computer. This external computer could be an item as simple as a handheld computer or pad type computer device. In addition, it could be a dedicated device or software application that can be used with and loaded on to a common pad type computer device.

In order to reduce wear and tear on the apparatus, the movement of the force coil assembly and of the cone assembly are limited and controlled by the internal computer. The internal computer works in conjunction with a second Hall element. In this case the Hall element works as a sensor and in conjunction with an external magnet which generates the necessary magnetic field intensity.

The Hall element is located near the magnet and both are located under the cone assembly. The Hall element is attached to a support that is attached to the frame. The magnet is attached to its own support which in turn is attached to the cone. The hall element support is made from a non-ferrous material.

The Hall element is in a parallel orientation with the magnet and has a face that faces the magnet. When the cone assembly oscillates up and down during the mixing process it will cause the magnet to correspondingly move back and forth across the face of the Hall element. This back and forth movement of the magnet across the face of the Hall element generates a magnetic field intensity. The magnetic field intensity will vary in intensity as the amplitude and frequency of the up and down movement of the cone assembly varies from time to time.

This varying in the amplitude and frequency of the movement of the cone assembly can be monitored and controlled by the internal computer. In this embodiment the current running through this Hall element is held constant. Using the Hall element equation mentioned above the output voltage can be expressed as follows: Vi=F(Rh*B). The current I is constant and hall coefficient Rh is known, we see that the voltage output Vi is directly proportional to variable magnetic field intensity B created by the movement of the magnet across the face of the Hall element.

Therefore, the voltage output of the Hall element will indicate to the internal computer the amplitude and frequency of the movement of the cone assembly. The internal computer can adjust the system to limit the movement of the force coil assembly and cone assembly to save on any unnecessary wear and tear.

In addition, the resonance point can be detected using this method. The resonance point for a given mixing job occurs when the cone assembly and force coil assemble reach actual peak movement. The voltage output of the Hall element will provide this information to the internal computer as voltage output is necessarily related to the movement of the two assemblies.

DETAILED DESCRIPTION OF THE INVENTION

Figure 1:
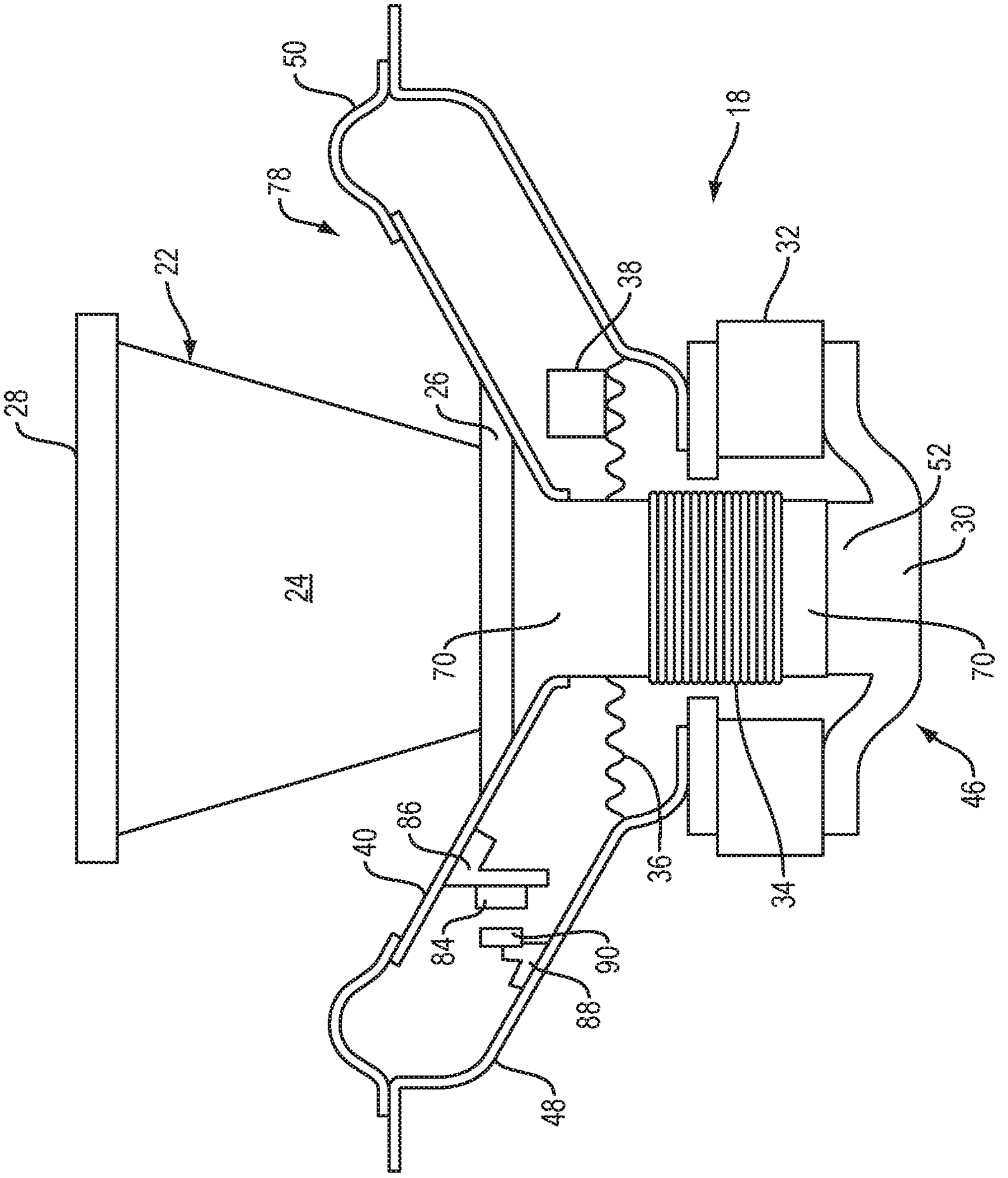
FIG. 1 is a cross sectional view of the force coil assembly with container attached.
Figure 2:
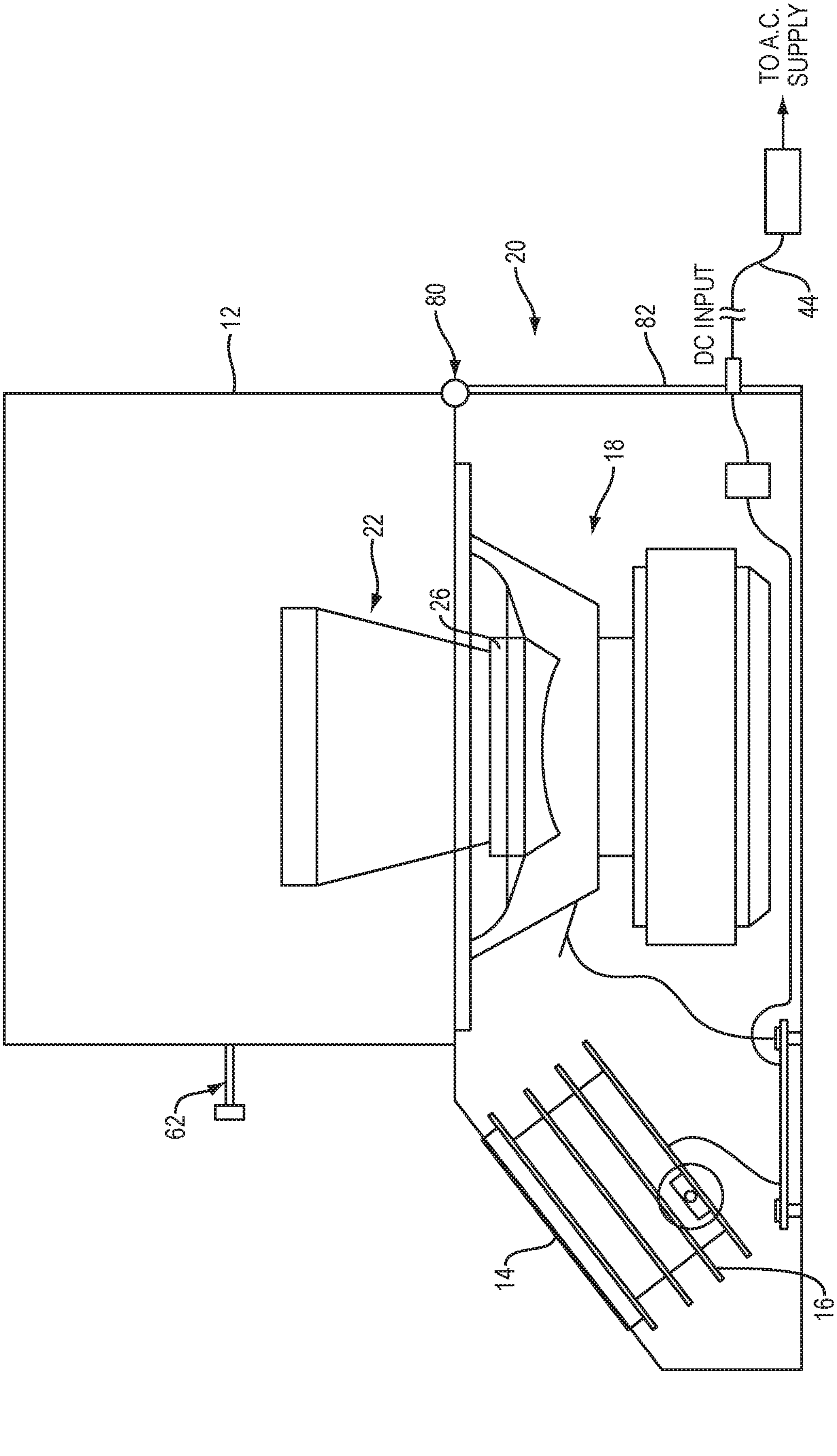
FIG. 2 is a cross sectional view of the enclosure with cover showing the force coil assembly, internal computer and container.
Figure 8:
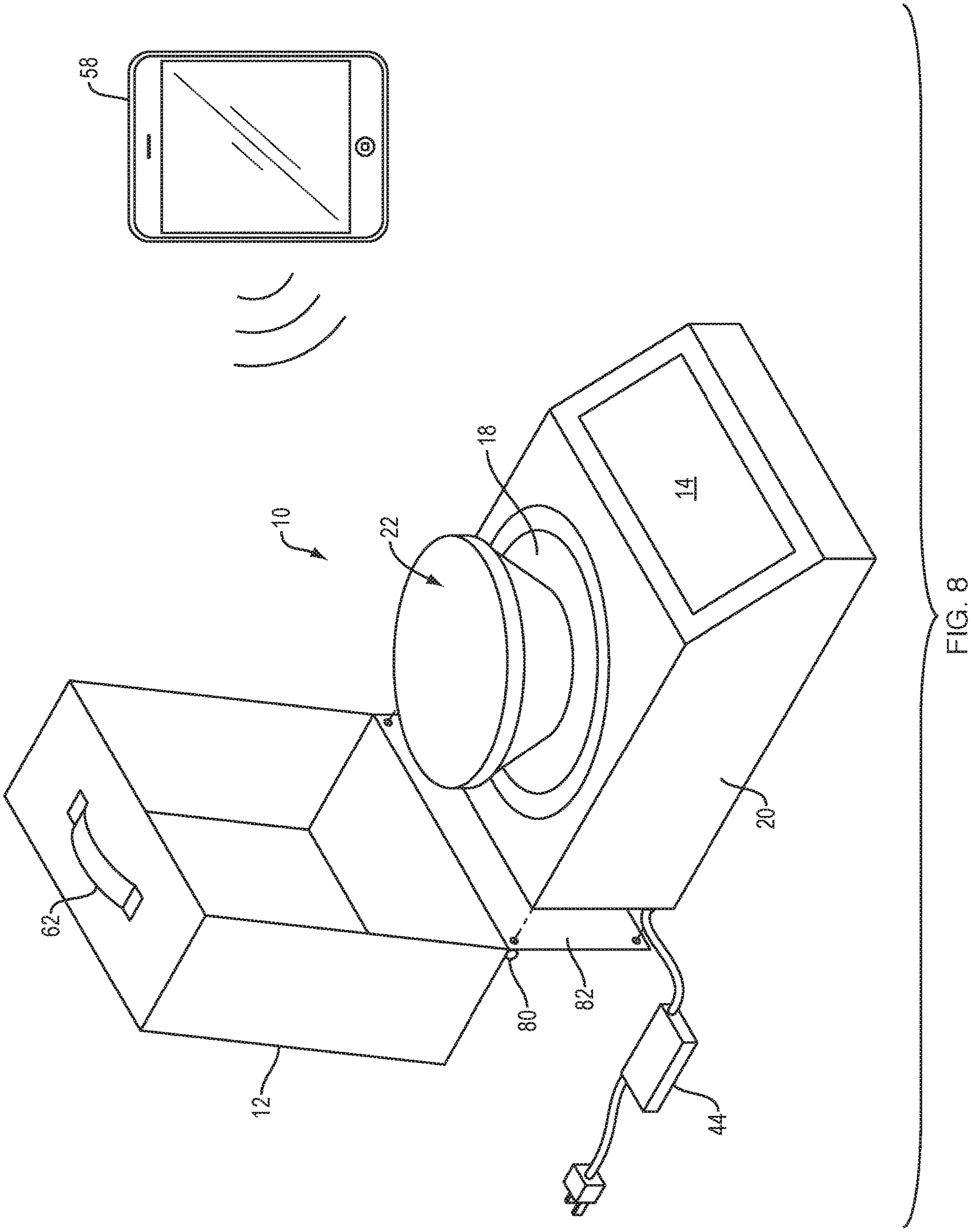
FIG. 8 is a perspective view of the sonic mixer and pad computer.

FIGS. 1, 2 and 8 show the preferred embodiment of the invention. FIG. 8 shows the external view of the invention. The sonic mixer 10 has an enclosure 20, a cover 12, here in its open position, a touch pad 14, an internal computer 16 and a force coil assembly 18. The cover 12 has a top, four sides, with a front and a back, an open bottom, and an attachment portion 82. A hinge 80 is located at the back side and bottom of the cover 12 and allows cover 12 to be moved from its open position to its closed position. The attachment portion 82 is how the cover is attached to the enclosure 20 using any method with the preferred embodiment being nuts and bolts. Affixed to the front of the cover 12 is a handle 62 to aid in moving the cover 12.

The cover 12 is lifted up to its open position thereby allowing the operator to attach a container 22 to the force coil assembly 18. The cover 12 is then moved to its closed position where it rests on top of the enclosure 20 and encloses the container 22. The cover 12 is made from any clear plastic, or similar, material. The enclosure 20 is made from a medal, or similar, material. The handle 62 is made from either a plastic or metal material.

FIG. 2 shows a cross sectional of the invention in its operational position. The cover 12 is closed and the container 22 is affixed to the force coil assembly 18 via an adapter ring 26. The internal computer 16 is shown below the touch pad 14. Also shown is an electrical source 44.

FIG. 1 shows a cross sectional of the force coil assembly 18 and its subparts. The force coil assembly 18 is similar in design and construction to an audio speaker. The force coil assembly 18 consists of magnet assembly 46, a spider 36, a force coil 34, a force coil tube 70, an adapter ring 26, a frame 48 and a cone assembly 78.

The magnet assembly 46 consists of a magnet frame 30 made from a soft iron material, a permanent round magnet 32 and a pole 52. The pole 52 is part of the magnet frame 30 and is axially aligned with the magnet 32 which is affixed to the magnet frame 30 in a matter known in the industry. Also affixed to the magnet frame 30 is the frame 48 which holds the cone assembly 78.

The cone assembly 78 has two parts, a flexible surround 50 and a cone 40. The frame 48 is attached to the flexible surround 50 which in turn is attached to the cone 40 in a matter known in the industry. The cone 40 is attached on one end to the flexible surround 50 and attached on the other end to force coil tube 70 in a manner known in the industry. The flexible surround 50 is made from a rubber, form or similar flexible material and the cone 40 is made from a paper based or similar material.

The force coil 34 consists of wire, typically copper, wrapped around the force coil tube 70, which is made of a paper, plastic or similar material, and with both being axially aligned with the pole 52 and the magnet 32. The force coil tube 70 fits over the pole 52 but is not attached to the same so that it is allowed to oscillate freely, and both are cylindrical in shape.

The top of the force coil tube 70 is affixed to the cone 40 in a manner known in the industry. A spider 36, a flat bellows spring made of beryllium copper or a stiff impregnated non-ferrous material, is used to refrain the force coil tube 70 from moving off its axis during operation and thus stay aligned with the pole 52 and with the magnet 32. The spider 36 is attached on one end to the force coil tube 70 and is attached on the other end to the frame 48 in a manner known in the industry.

The adapter ring 26 is attached to the force coil tube 70 and is attached to the cone 40, with the preferred embodiment being an adhesive with an epoxy base material being the adhesive. As both the cone 40 and adapter ring 26 are affixed to the force coil tube 70, and in turn the force coil tube 70 is attached to the force coil 34, all parts will oscillate in unison with the force coil 34. Once the container 22 is attached to the adapter ring 26, it too will oscillate and move in unison with the force coil 34.

Figure 3:
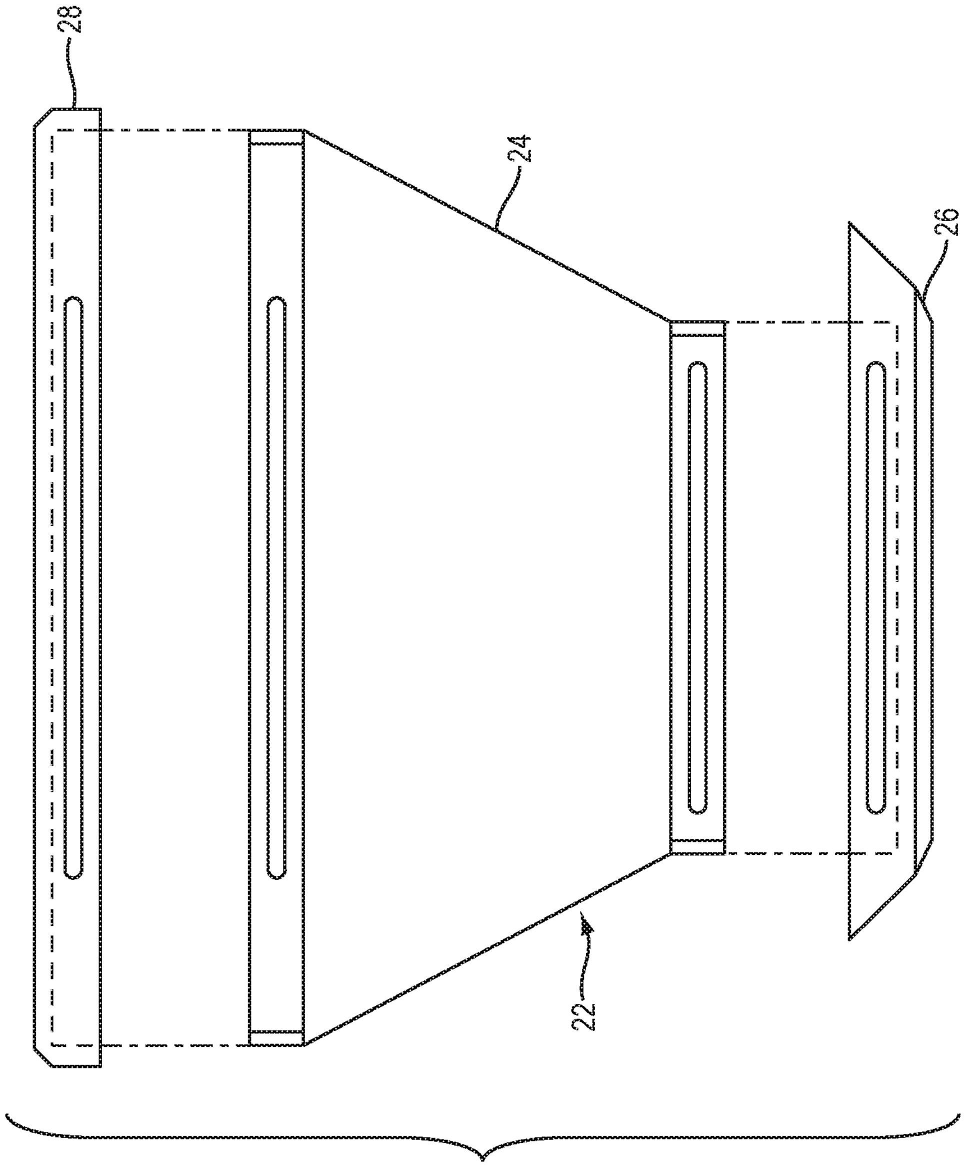
FIG. 3 is a side elevation view of the container and its three subparts.

FIG. 3 shows the container 22 and its subparts along with the adapter ring 26. The container 22 consists of a top 28 and a tapered body section 24. The body section 24 has an open top, a side and a solid bottom. The top 28 has an outer section and inner section. The top 28 is designed to engage and affixed to the top of the body section 24, with the preferred embodiment being a threaded connection although other methods could be used. The outside of the top of the body section 24 has a thread portion that is designed to engage a corresponding threaded portion which is in the inner section of the top 28.

The bottom of the body section 24 is designed to engage the adapter ring 26, which has an outer portion and inner portion. The typical connection would be a threaded connection although other methods could be used. The outside of the bottom of the body section 24 has a threaded portion and the inner portion of the adapter ring 26 has a corresponding threaded portion so the body section 24 can be screwed into and secured in the adapter ring 26. The container 22 and its parts are typically made from a plastic based material.

The body section 24 of the container 22 is conical in shape with the top being open and the bottom being solid, similar in design to a common drinking glass or cup. The body section 24 is conical in shape, although it may come in a variety of shapes such as cylindrical. The material to be mixed is placed into the body section 24 through its open top and the cover 28 is affixed to the top of the body section 24 as described above.

The adapter ring 26 is affixed to the force coil assembly 18 as mentioned above and as shown in FIG. 1. When the operator is ready to mix the materials she simply starts by placing the materials to be mix into the body section 24 through its open top. She then attaches the top 28 to the body section 24 as described above. The container 22 is the affixed to the force coil assembly 18 by simply connecting the bottom of the body section 24 to the adapter ring 26 via the threaded connection mentioned above.

When the materials are ready to be mixed, the operator will close the cover 12 and start the sonic mixer 10. In the preferred embodiment the force coil 34 is charged by the electrical source 44 with the internal computer 16 monitoring the process. The system is placed in mechanical resonance in a number of different methods.

The preferred embodiment is to have an electrical source 44 generate a variable frequency constant amplitude alternating voltage or variable frequency constant amplitude alternating current. As the force coil 34 is charged by the electrical source 44, it will cause the force coil 34 to oscillate up and down due to its relationship with the magnet 32, a process known in the industry of audio speakers. As mentioned above once the container 22 is attached to the adapter ring 26 it will move and oscillate in unison with the force coil 34.

This oscillation movement of the system will create the necessary agitation to mix the contents in the container 22 without the need for stirring. The oscillation is increased until the system is placed in mechanical resonance where the mixing efficiency is at its maximum as the agitation caused by being at resonance is at its maximum. This is achieved with the minimal amount of energy.

Figure 6:
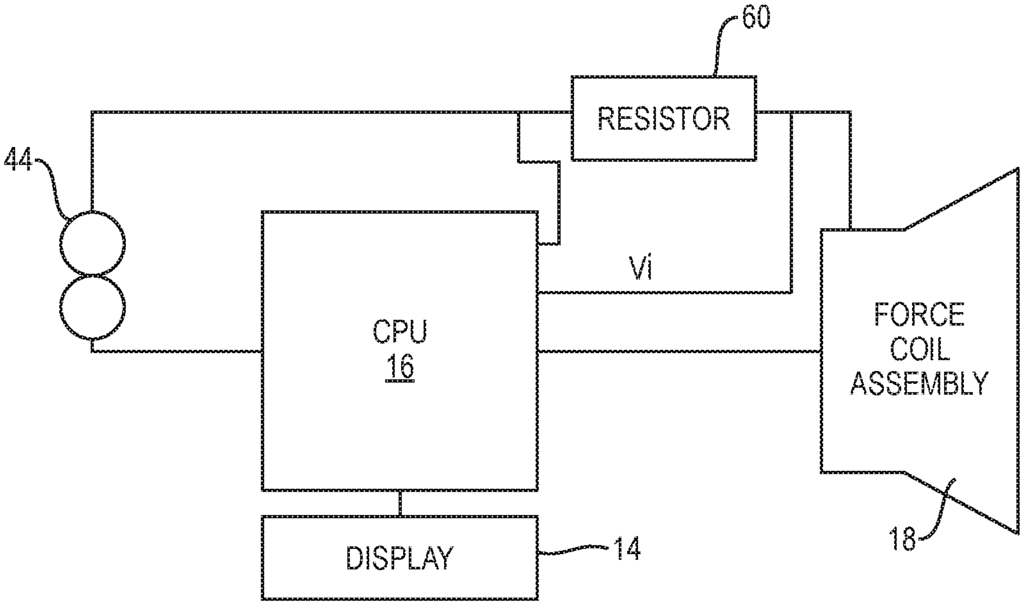
FIG. 6 is an electronic schematic showing the resistor in series with the force coil assembly.
Figure 6A:
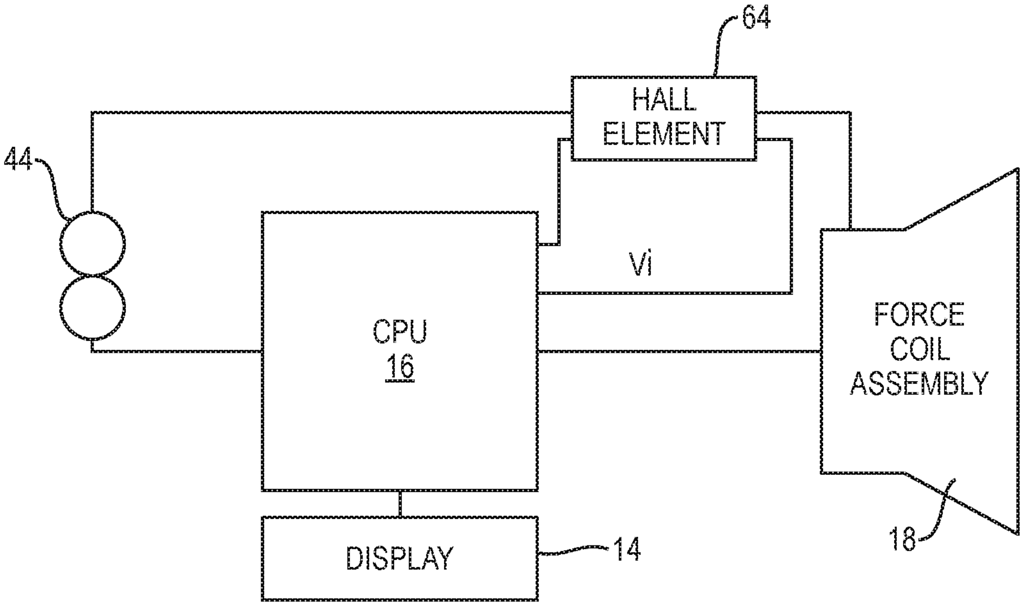
FIG. 6A is an electronic schematic showing the Hall element in series with the force coil assembly.

In the preferred embodiment a Hall element 64 is placed in electronic series with the force coil assembly 18. FIG. 6A is an electrical schematic of this embodiment. Hall element 64 generates a voltage, Vi, which is directly proportional to the current flowing through the element. The voltage generated by the Hall element 64 is measured, recorded and monitored by the internal computer 16. The Hall element 64 has a hall coefficient, Rh. The Hall element 64 also has an internal magnet that creates a constant magnetic field intensity independent of the electrical current that runs through the Hall element 64.

The current running through the Hall element 64 can be calculated by the following equation: I=Vi (Rh*B). Where I is the current, Vi is the voltage output, Rh is the hall coefficient and B is the magnetic field intensity created by the internal magnet. As Rh and B are known for the given Hall element 64 the internal computer 16 can then make the above calculation to calculate the current for a given voltage output by the Hall element 64. The internal computer 16 will make these calculations continuously as the system runs and as the voltage output from the Hall element 64 changes from time to time. Therefore, the internal computer 16 in conjunction with the Hall element 64 will be able to provide a continuous stream of the value of the current running through the Hall element 64.

There are a few ways to achieve placing the system in resonance using the Hall element 64. In the preferred method a variable frequency constant amplitude alternating voltage is used to energize the force coil 34. Resonance is achieved by varying the frequency of the constant amplitude alternating voltage from high to low until the voltage Vi generated by the Hall element 64 output is at its absolute minimum.

Figure 4A:
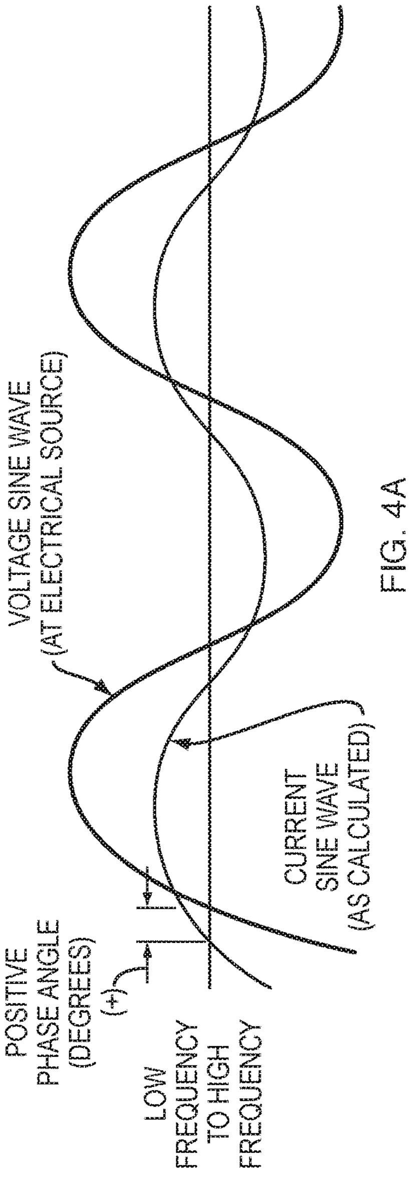
FIG. 4A is a chart showing the voltage sine wave and current sine wave where the relationship between the two waves is a positive degree phase angle.
Figure 4B:
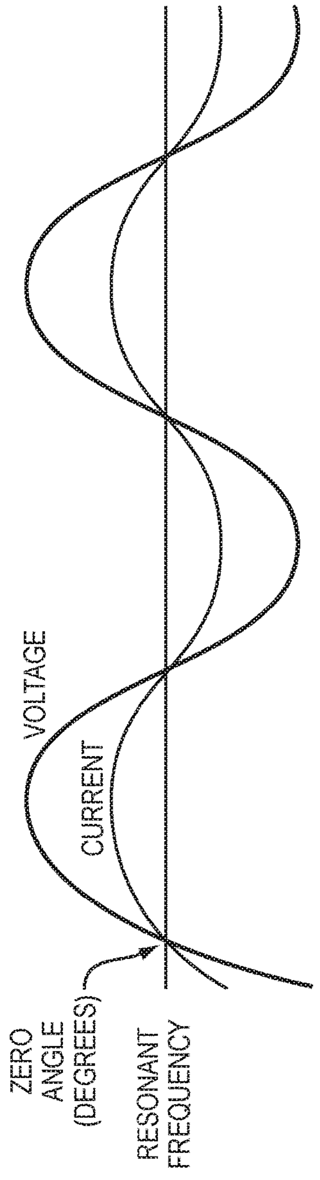
FIG. 4B is a chart showing the voltage sine wave and current sine wave where the relationship between the two sine waves is a zero degree phase angle.
Figure 4C:
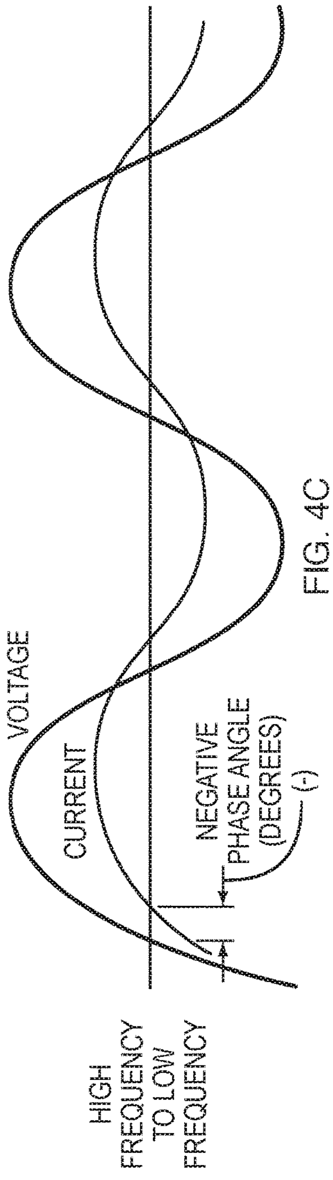
FIG. 4C is a chart showing the voltage sine wave and current sine wave where the relationship between the two sine waves is a negative degree phase angle.
Figure 5:
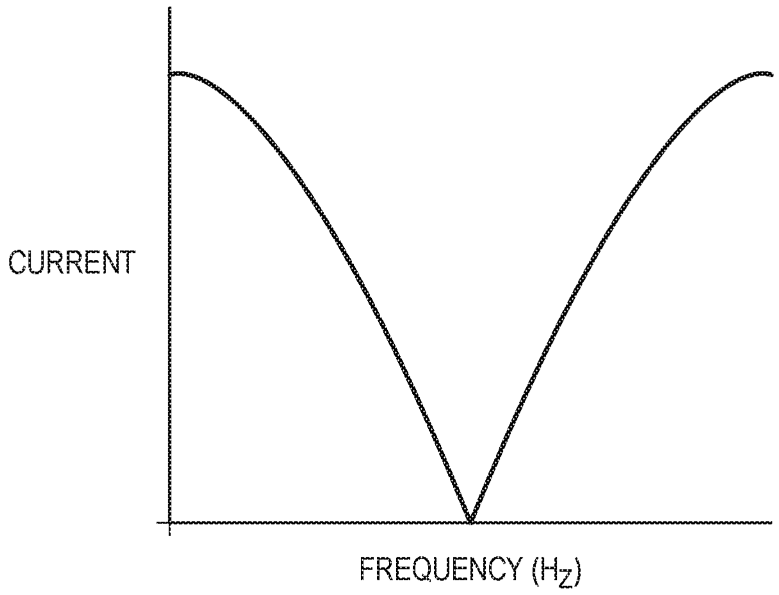
FIG. 5 is a chart showing the relationship between current and frequency.

Another method is to monitor and compare the phase angle difference between an applied voltage sine wave and a current sine wave and adjust the same by varying the frequency of the electrical source. The applied voltage sine wave is created from voltage measured at the electrical source 44 by the internal computer 16. The current sine wave is created by the internal computer 16 from the current calculated as described above using the voltage output, Vi, of the Hall element 64, which is directly proportional and in-phase with the current. FIGS. 4A, 4B, and 4C charts show the change in frequency from high frequency to low frequency and vice versa, and how the change in frequency affects the phase angle, measured in degrees, between the voltage sine wave and current sine wave. At high frequency the phase angle is negative degrees (FIG. 4C) and at low frequency the phase angle is positive degrees (FIG. 4A). In between the phase angle will reach a zero degrees phase angle and that is the resonant point of the particular mixing job (FIG. 4B). The internal computer 16 will monitor the system and will adjust the frequency of the electronic source such that the system reaches and is maintained at the resonant point, a zero degrees phase angle.

Another embodiment is to use a low value resistor 60 in place of the Hall element 64 and is placed in series with the force coil assembly 18. FIG. 6 is an electrical schematic of this embodiment. The voltage, Vi, across the resistor is measured and monitored by the internal computer 16. Using Ohm's law and the known value of the resistor 60, one can calculate the current the across the resistor 60 using the voltage measured across the resistor 60. The system is placed in resonance using the same methods set forth in the Hall element embodiment described above.

With the variable frequency constant amplitude alternating voltage method, the voltage, Vi, is monitored and the internal computer 16 will adjust the frequency of the electrical source 44 from high to low until the voltage Vi is at its absolute minimum where the system is in resonance. With the sine wave method, the applied voltage sine wave is created from voltage measure at the electrical source 44, the current sine wave is created by the current as calculated by the internal computer 16 as described above using the voltage, Vi, measured across the resistor, which is directly proportional and in-phase with the current. The internal computer 16 will adjust the frequency of the electrical source 44 so the phase angle between the two sine curves reaches zero degrees, and thus the resonant point.

Figure 7:
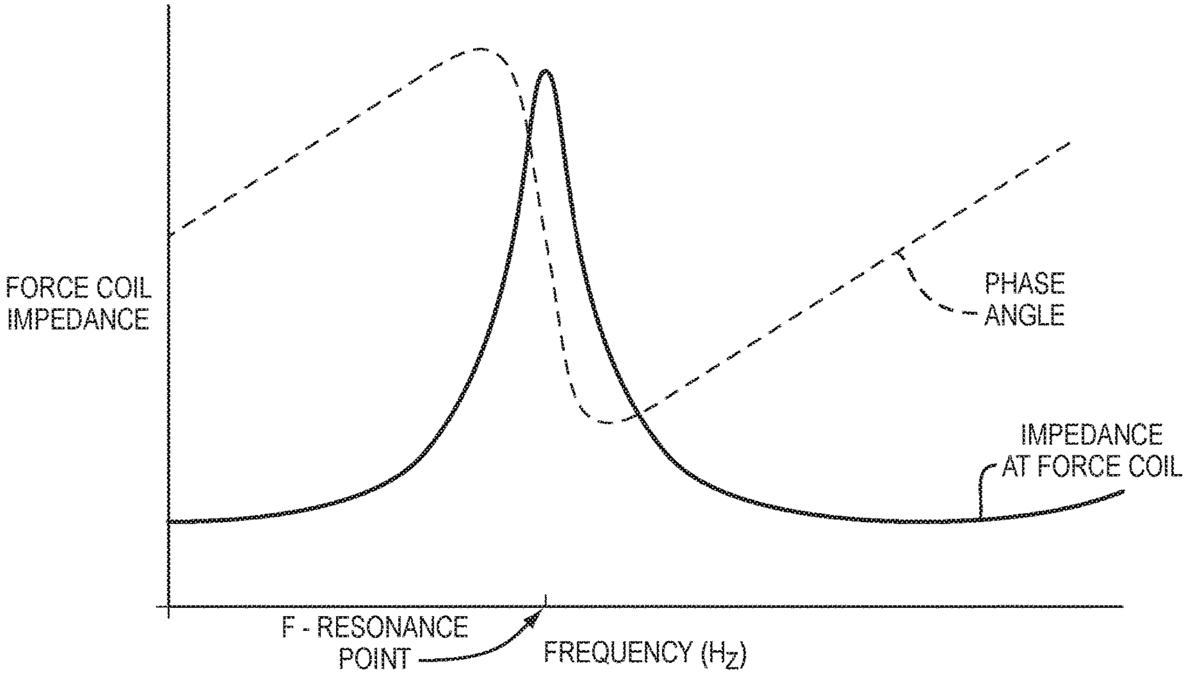
FIG. 7 is a chart showing the relationship of the force coil impedance, frequency and phase angle.

Another embodiment uses a constant current as an electrical source. FIG. 7 is a chart showing the same concept as described above and the phase angle relationship with the impedance at the force coil 34. The system is at its resonant frequency when the impedance is at its maximum and the phase angle is at zero degrees. A variable frequency constant amplitude alternating current is used to energize the force coil 34. The internal computer 16 measures the amplitude of the voltage across the force coil 34 and also adjusts the frequency of the electrical source 44. When the frequency of the constant amplitude current varies from high to low the voltage across the force coil 34 will reach its absolute maximum. At the same time the impedance of the system will reach its maximum, and at this point, the system is in resonance.

In another embodiment the internal computer 16 monitors the system and the electrical source 44 provides a variable frequency constant amplitude alternating voltage or a constant amplitude voltage to the force coil 34. The internal computer 16 will increase the frequency of the electrical source from zero to a point where the resonant point is reached for a particular mixture mass. The internal computer 16 can past the resonant frequency and return the system to the resonant frequency. The resonant frequency will differ from job to job as the weights of the jobs will differ from job to job.

Figure 9:
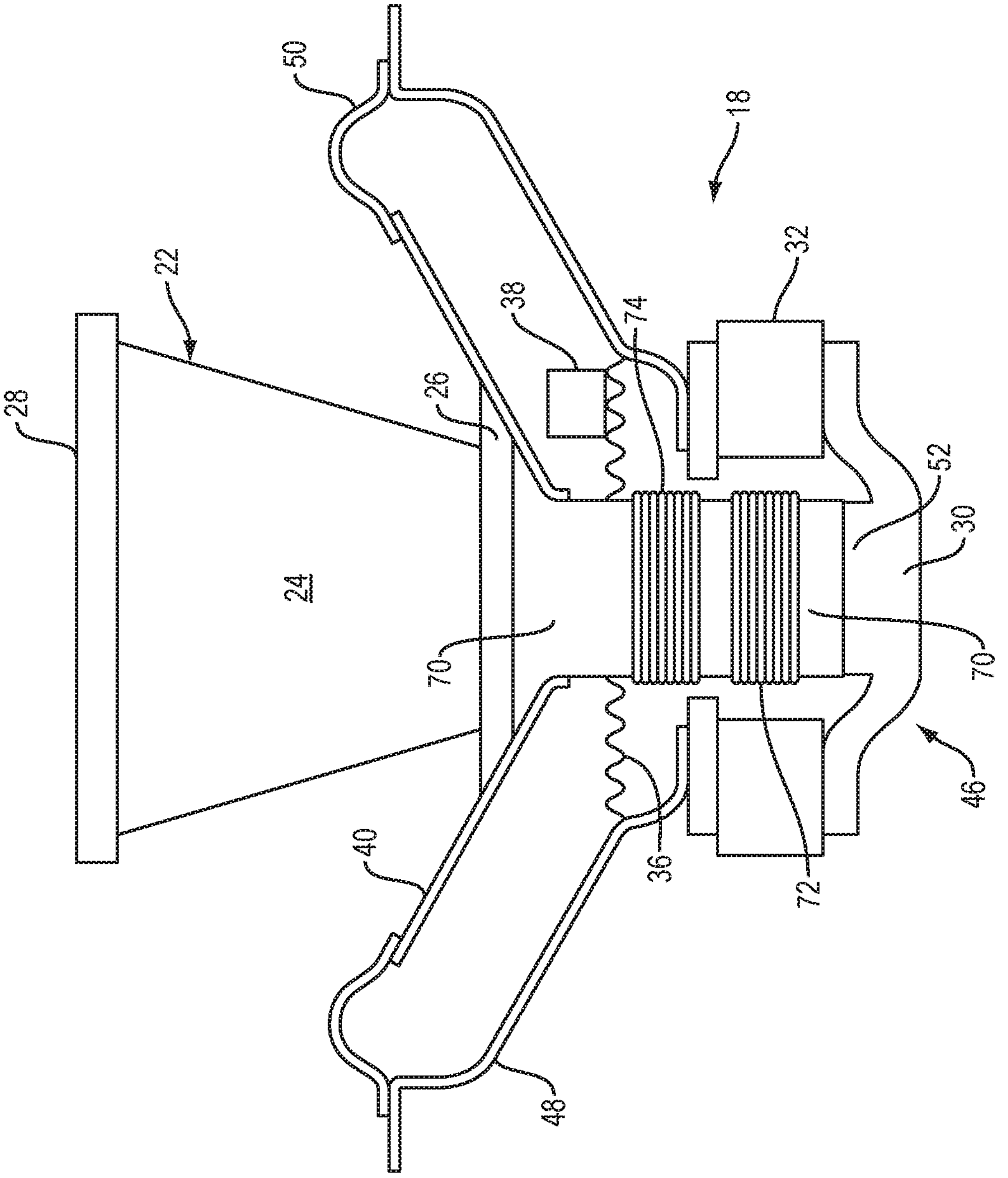
FIG. 9 is a cross sectional view of the force coil assembly with container attached and showing the two coil embodiment.

Another embodiment is to employ two coils and shown in FIG. 9. The two coils are in the same position as with the single force coil embodiment, each wrapped around and axially aligned with the force coil tube 70, axially aligned with the magnet 32, and axially aligned with each other on the force coil tube 70.

A first coil 74 is charged by the electrical source 44 as the force coil 34 is charged in the single force coil embodiment and acts in the same manner as the force coil 34 causing the system to oscillate up and down. As this first coil 74 oscillates and moves the assembly a second force coil 72 moves and oscillates in unison and moves through the magnetic field of the magnet 32. A second force coil 72 is employed to measure the voltage created as this coil moves through the magnetic field of the magnet 32 in a manner known in the industry. The second force coil 72 will provide a continuous record of the frequency and amplitude of the movement of the force coil assembly 18 and the same is recorded and monitored by the internal computer 16. Using a constant current source, when the voltage recorded is at its highest the system is in resonance.

In yet another embodiment of the invention an accelerometer 38 is used with the invention. The accelerometer 38 is attached to the spider 36 and thus will thus move in relationship with the force coil assembly 18. Thus, the accelerometer 38 will measure the acceleration of the movement of the spider 36, attached to the force coil assembly 18. The frequency of the electrical source is varied and at the frequency when the acceleration reaches its maximum, the system is in resonance.

A handheld pad type computer 58 can be employed with the system so the system can be run remotely as opposed to having to use the touch pad 14. FIG. 8 shows the handheld pad type computer 58 which wirelessly interacts with sonic mixer 10 to act in conjunction with the internal computer 16.

In order to save on wear and tear on the apparatus a second Hall element 90 is used and works in conjunction with a hall magnet 84 which generates the necessary magnetic field intensity. As there is an external magnet the Hall element 90 does not have an internal magnet and works simply as a sensing device.

The Hall element 90 and magnet 84 are both located under the cone assembly 78. The Hall element 90 is attached to a support 88 that is attached to the frame 48. The magnet 84 is attached to its own support 86 which in turn is attached to the cone 40. The hall element support 86 is made from a non-ferrous material.

The Hall element 90 is in a parallel orientation with the magnet 84. The Hall element 90 has a face that faces the magnet 84. When the cone assembly 78 oscillates up and down during the mixing process it will causes the magnet 84 to move back and forth across the face of the Hall element 90. As the magnet 84 is attached to the cone 40 of the cone assembly 78, the magnet 84 will naturally move in the same manner as the movement of cone assembly 78.

The back and forth movement of the magnet 84 across the face of the Hall element 90 generates a magnetic field intensity which varies in intensity as the amplitude and frequency of the up and down movement of the cone assembly varies from time to time. This varying in the amplitude and frequency of the movement of the cone assembly can be monitored and controlled by the internal computer 16.

In this embodiment the current running through this Hall element 90 is held constant. Using the Hall element equation mentioned above the output voltage can be expressed as follows: Vi=I/(Rh*B). As the current I is constant and Hall coefficient Rh is known, one sees that the voltage output Vi is directly proportional to variable magnetic field intensity B created by the movement of the magnet 84 cross the face of the Hall element 90.

Therefore, the voltage output of the Hall element 90 will indicate to the internal computer 16 the amplitude and frequency of the movement of the cone assembly 78. The internal computer 16 can adjust the system to limit the movement of the force coil assembly 18 and cone assembly 78 to save on any unnecessary wear and tear.

In addition, the resonance point can be detected using this method. The resonant point for a given mixing job occurs when the cone assembly 78 and force coil assembly 18 reach actual peak movement. The voltage output of the Hall element 90 will provide this information to the internal computer 16 as voltage output is necessarily related to the movement of the two assemblies.

The invention claimed is:

1. An apparatus comprising:

a magnet assembly comprising a round magnet, a magnet frame, a pole, and where the magnet is attached to the magnet frame and is axially aligned with the pole, and where the pole is attached to the magnet frame;

a force coil assembly comprising a force coil and a force coil tube, where the force coil is a wire wrapped around and axially aligned with the force coil tube, and where the force coil assembly fits over and is axially aligned with both the pole and the magnet;

a frame;

a spider which is attached to the frame, attached and axially aligned with the force coil assembly;

a cone assembly comprising a flexible surround and a cone where the flexible surround is attached to the frame and to the cone;

an adapter ring that is affixed to the cone and to the force coil tube, and where the adapter ring has an outer portion and an inner portion and where the inner portion has a threaded portion;

a container comprising a top, a body section, and where the body section has an open top, a side and bottom, where the bottom has an outside which has a threaded part with such threaded part designed to engage the corresponding threaded part of the inner portion of the adapter ring and thereby securely attaching the container to the adapter ring;

where the materials to be mixed are adding through the open top of the container;

a touch screen which allows an operator to operate and run the apparatus;

an electrical source that generates a variable frequency constant amplitude alternating voltage that charges the force coil causing the same to oscillate;

an internal computer which runs the apparatus;

a Hall element which is placed in electronic series with the force coil, and where the Hall element outputs a voltage that is proportional to the current running through the Hall element, and where the internal computer automatically adjusts and lowers the frequency of the electrical source from a higher frequency to a lower frequency and to a point where the voltage output of the Hall element is at its minimum at which point mechanical resonance is achieved and where the internal computer maintains the mechanical resonance of the materials in the container;

an enclosure;

and a cover comprising a top, four sides, with a front side and back side, an open bottom, and an attachment portion designed to attach the cover to the enclosure.

2. An apparatus as in claim 1:

where the internal computer measures the voltage at the electrical source and uses the voltage output of the Hall element to calculate the current running through the Hall element;

where the internal computer creates a voltage sine wave from the voltage measured at the electrical source and creates a current sine wave from the current as calculated from the voltage output of the Hall element;

where the internal computer compares the two sine waves such that a phase angle between the two sine waves is observed and is measured in degrees and is either positive or negative;

and where the internal computer automatically adjusts the frequency of the electrical source such that the phase angle between the two sine curves reaches zero degrees and which is the point where the system is in mechanical resonance and where the internal computer maintains the mechanical resonance of the materials in the container.

3. An apparatus as in claim 1:

where the internal computer automatically increases the frequency of the electrical source from a zero frequency to the resonant frequency for a given mixing job's weight.

4. An apparatus as in claim 1:

where the electrical source provides a variable frequency constant amplitude alternating current charge to the force coil and where the internal computer measures the amplitude of the voltage across the force coil and automatically adjusts the frequency of the electrical source from high to low until the voltage across the force coil reaches its absolute maximum thereby placing the system in mechanical resonance and where the internal computer maintains the mechanical resonance of the materials in the container.

5. An apparatus as in claim 1:

where two coils, a first coil and a second coil, are employed and where each coil is made of wire and each being wrapped around and axially aligned with the force coil tube and each other, and axially aligned with the magnet, and where the first coil is energized by the electrical source and replaces the force coil and the second coil is used to measure a voltage created by the force coil assembly movement in relation the magnet, and where the system is in mechanical resonance when the voltage measured is at its maximum.

6. An apparatus as in claim 1 further comprising:

an accelerometer that is attached to the spider and where said accelerometer is used to measure the movement of the force coil assembly with resonance being achieved when movement of the force coil assembly is at its maximum.

7. An apparatus as in claim 1 further comprising:

an external pad type computer which works in conjunction with the internal computer.

8. An apparatus as in claim 1 further comprising:

a second Hall element and a second magnet where the second Hall element has a face and is attached to the frame and second magnet is attached to the cone assembly, and where the movement of the cone assembly causes the second magnet to move across the face of the second Hall element creating a voltage output of the Hall element which the internal computer uses to measure the movement of the cone assembly and force coil assembly.

9. An apparatus comprising:

a magnet assembly comprising a round magnet, a magnet frame, a pole, and where the magnet is attached to the magnet frame and is axially aligned with the pole, and where the pole is attached to the magnet frame;

a force coil assembly comprising a force coil and a force coil tube, where the force coil is a wire wrapped around and axially aligned with the force coil tube, and where the force coil assembly fits over and is axially aligned with both the pole and the magnet;

a frame;

a spider which is attached to the frame, attached and axially aligned with the force coil assembly;

a cone assembly comprising a flexible surround and a cone where the flexible surround is attached to the frame and to the cone;

an adapter ring that is affixed to the cone and to the force coil tube, and where the adapter ring has an outer portion and an inner portion and where the inner portion has a threaded portion;

a container comprising a top, a body section, and where the body section has an open top, a side and bottom, where the bottom has an outside which has a threaded part and such threaded part is designed to engage the corresponding threaded part of the inner portion of the adapter ring and thereby securely attaching the container to the adapter ring;

where the materials to be mixed are adding through the open top of the container;

a touch screen which allows an operator to operate and run the apparatus;

an electrical source that generates a variable frequency constant amplitude alternating voltage that charges the force coil causing the same to oscillate;

an internal computer which runs the apparatus;

a resister which is placed in electronic series with the force coil, and where the voltage across the resistor is measured and the internal computer automatically adjusts the frequency of the electrical source to a point where the voltage across the resistor is at its minimum at which point the system is in mechanical resonance and where the internal computer maintains the mechanical resonance of the materials in the container;

an enclosure;

and a cover comprising a top, four sides, with a front side and back side, an open bottom, and an attachment portion designed to attach the cover to the enclosure.

10. An apparatus as in claim 9:

where the voltage across the resistor is measured and the current running through the resistor is calculated by the internal computer using Ohm's Law;

where the internal computer creates a voltage sine wave from the voltage measured at the electrical source and a current sine wave from the current as calculated from the voltage measured across the resistor;

where the internal computer compares the two sine waves such that a phase angle between the two sine curves is observed and is measured in degrees and is either positive or negative;

and where the internal computer automatically adjusts the frequency of the electrical source such that the phase angle between the two sine curves reaches zero degrees and which is the point where the system is in mechanical resonance and where the internal computer maintains the mechanical resonance of the materials in the container.

* * * * *